(12) United States Patent
Wicks (10) Patent No.: US 9,771,857 B1
(45) Date of Patent: Sep. 26, 2017

(54) SYSTEM AND METHOD FOR ENGINE BOOSTING

(71) Applicant: Ford Global Technologies, LLC, Dearborn, MI (US)

(72) Inventor: Christopher Donald Wicks, Allen Park, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/154,632

(22) Filed: May 13, 2016

(51) Int. Cl.
| F02B 33/44 | (2006.01) |
| F02M 25/10 | (2006.01) |
| F02M 37/00 | (2006.01) |
| F02B 39/04 | (2006.01) |
| F02B 39/12 | (2006.01) |
| F02D 41/00 | (2006.01) |

(52) U.S. Cl.
CPC ............... *F02B 33/44* (2013.01); *F02B 39/04* (2013.01); *F02B 39/12* (2013.01); *F02D 41/0007* (2013.01); *F02D 41/0025* (2013.01); *F02M 25/10* (2013.01); *F02M 37/0023* (2013.01); *F02D 2200/0406* (2013.01); *F02D 2200/101* (2013.01); *F02D 2200/1002* (2013.01)

(58) Field of Classification Search
CPC .......... F02B 33/44; F02B 39/04; F02B 39/12; F02M 25/10; F02M 37/0023; F02D 41/0007; F02D 41/0025; F02D 2200/0406; F02D 2200/1002; F02D 2200/101

See application file for complete search history.

(56) References Cited

U.S. PATENT DOCUMENTS

| 4,021,214 | A | 5/1977 | Bush |
| 6,349,709 | B1 | 2/2002 | Evert et al. |
| 6,758,198 | B1 | 7/2004 | Suhre et al. |
| 7,243,949 | B2 | 7/2007 | Valdez et al. |
| 7,753,148 | B2 | 7/2010 | Kokot et al. |
| 8,146,948 | B2 | 4/2012 | Burns |
| 8,371,118 | B2 | 2/2013 | Ulrey et al. |
| 2005/0062251 | A1 | 3/2005 | Ramsey |
| 2010/0139636 | A1* | 6/2010 | Atherley ............... F02B 43/10 123/585 |
| 2011/0308483 | A1 | 12/2011 | Lafferty |
| 2015/0361926 | A1* | 12/2015 | Eckhardt ............... F02M 25/00 123/446 |

* cited by examiner

*Primary Examiner* — Joseph Dallo
(74) *Attorney, Agent, or Firm* — Julia Voutyras McCoy Russell LLP (57) ABSTRACT

An internal combustion engine may be coupled to a two-step engine boosting system to provide desired boost to the engine to meet torque demand. The two-step engine boosting system may first provide boost to the engine by nitrous oxide injection into the engine, followed by switching to providing boost from a frame rail air boosting system to generate the desired boost. Air from an air pump coupled to a transmission of the engine may flow air to the frame rail air boosting system for storage and for subsequent use in providing boost to the engine.

20 Claims, 8 Drawing Sheets

SYSTEM AND METHOD FOR ENGINE BOOSTING

BACKGROUND/SUMMARY

Internal combustion engines are coupled to engine boosting systems which deliver boost to the engine to meet engine torque demands. The engine boosting system may include a compressor delivering compressed air on an inlet side of the engine, increasing the boost available to the engine. Addition of an oxygen enhancer into cylinders of the internal combustion engine lowers inlet air temperature, elevates cylinder pressure, and provides boost to the engine by allowing the engine to burn more fuel. Increased fuel combustion creates more cylinder pressure driving down the pistons, turning the crank train with greater force which results in more engine power to meet torque demands. One widely used oxygen enhancer is nitrous oxide. When Nitrous oxide ($N_2O$) is injected into the engine cylinders, the initial combustion within the cylinder creates enough heat to separate the nitrous oxide into its two components, nitrogen, and oxygen. Once this separation occurs, the oxygen can then be used to burn more fuel in the engine.

Attempts to deliver boost to the engine include the system disclosed by U.S. Patent Application No. 20110308483 A1, which discloses a nitrous oxide injection system, where the nitrous oxide is stored under high pressure in a tank and is directed from the tank to a fuel supply line. The nitrous oxide mixed with fuel in the fuel supply line is directly delivered into the engine cylinders to provide the requested boost to the engine.

However, the inventor herein has recognized an issue with the above approach. While some vehicle conditions require a high, sustained boost demand (e.g., engine boosting systems in race cars) most real world driving conditions require relatively short durations of boost for providing additional power to the engine (e.g., during acceleration events). As such, some engine boosting systems may be built to provide more boost than is actually needed, increasing vehicle system cost and complexity.

The inventor herein proposes a two-step boosting system to address the above cited problems, at least partially. In one example, the two-step boosting system may include a nitrous oxide storage tank fluidically coupled to an engine through a feed line, an air pump driven by a transmission of the engine, the air pump fluidically connected to a frame rail boosting system fluidically coupled to the engine, a first valve regulating nitrous oxide flow from the feed line to the engine, and a second valve regulating air flow from the frame rail boosting system to the engine.

An example method of operating a two-step boosting system may include, responsive to an engine torque demand above a threshold, injecting nitrous oxide from a nitrous oxide injection system to an engine, and responsive to the engine torque demand above the threshold for more than a threshold time and responsive to a pressure of a frame rail boosting system above a threshold pressure, suspending nitrous oxide injection and injecting compressed air to the engine from the frame rail boosting system, the frame rail boosting system receiving compressed air from an air pump driven by a transmission of the engine.

In this way, boost may be supplied to the engine either by nitrous oxide injection or by switching to injecting compressed air stored in the frame rail boosting system, providing a cost effective and efficient system for delivering boost during real world driving conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Adequate boost may be provided to an engine to meet the torque demands, for example, during uphill driving, by delivering charge air to the engine and/or by supplying an oxygen source to the engine to enhance fuel combustion, thereby generating adequate power for meeting the torque demands. An engine system illustrated in FIG. 1 may be coupled to one or more engine boosting system to provide the desired torque. A two-step engine boosting system shown in FIGS. 2-5 may be coupled to the engine of FIG. 1 to provide requested boost to the engine by either delivering nitrous oxide to the engine or by switching to delivering compressed air from a frame rail boosting system to the engine. Airflow paths along the two-step engine boosting system to the engine are illustrated in a schematic in FIG. 6. The two-step engine boosting system may be operated by regulating positions of a valve delivering nitrous oxide and a valve delivering compressed air from the frame rail boosting system to the engine, responsive to engine operating parameters, according to a method illustrated in FIG. 7. FIG. 8 shows example operation sequence of the two-step engine boosting system.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 1:
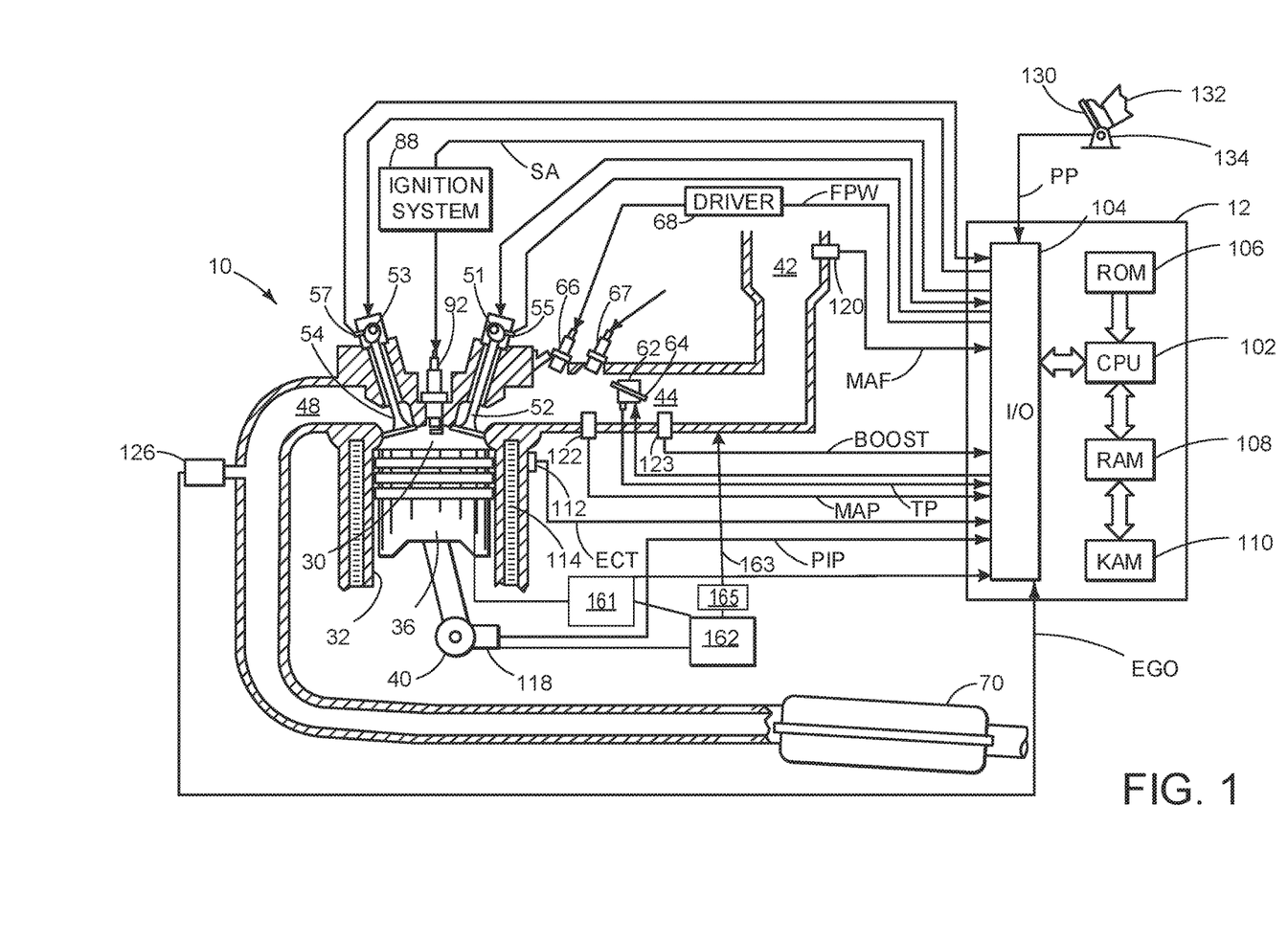
FIG. 1 shows an embodiment of an internal combustion engine.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown arranged in intake manifold 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection. Additionally, a second fuel injector 67 may be arranged in the intake manifold 44.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 may provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. Emission control device 70 is shown arranged along exhaust passage 48 downstream of exhaust gas sensor 126. Device 70 may be a three way catalyst (TWC), $NO_x$ trap, various other emission control devices, or combinations thereof. In some embodiments, during operation of engine 10, emission control device 70 may be periodically reset by operating at least one cylinder of the engine within a particular air/fuel ratio.

Engine 10 may further include a compression device, such as a compressor 162 arranged along intake manifold 44. The compressor 162 may be coupled to and at least partially driven by a transmission 162 of the engine, while no turbine may be coupled to the compressor. Air from the compressor 162, which is driven by the transmission 161, may be directed through an air line 163 to the intake manifold 44. In one example, the air line 163 from the compressor 162 may join the intake manifold 44 upstream of the throttle 62. A charge air cooler 165 may be present downstream of the compressor 162. The charge air cooler 165 may be upstream of the throttle 62, along the air line 163, joining the intake manifold 44. In other examples, more than one air charge cooler may be present between the compressor 162 and the engine 10. In one example, a turbocharger may be included, where a compressor (which may be a separate or the compressor 162) may be at least partially driven by a turbine via a shaft arranged along the exhaust passage 48.

The amount of compression (e.g., boost) provided to one or more cylinders of the engine via the compressor 162 may be varied by controller 12. Further, a sensor 123 may be disposed in intake manifold 44 for providing a BOOST signal to controller 12. A gearbox may couple an output shaft of the transmission 161 to an input shaft of the compressor 162, as will be discussed further with reference to FIG. 2. The engagement of the air compressor 162 by the transmission 161 may be regulated by the controller 12 and may depend on engine operating parameters, as will be discussed below with reference to FIGS. 2-7.

In addition to the compressor 162, additional boosting systems, for example, an oxygen enhancer injection system (such as nitrous oxide injection system), may introduce additional oxygen into the engine cylinders to enhance fuel combustion, thus providing boost to the engine. One or more boosting systems coupled to the engine may be regulated to provide desired boost to the engine in the most efficient manner, depending on engine operating parameters, including engine torque demand, engine speed, gear ratio, etc.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to water jacket 114; a profile ignition pickup signal (PIP) from Hall effect sensor 118 (or other type) coupled to crankshaft 40; throttle position (TP) from a throttle position sensor; and absolute manifold pressure signal, MAP, from manifold air pressure sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

FIGS. 2-5 will be described collectively. FIGS. 2-5 illustrate a two-step engine boosting system 200 coupled to an engine 201. The engine 201 may be a multi-cylinder engine, such as the engine 10, a single cylinder of the engine 10 illustrated FIG. 1. The two-step engine boosting system 200 may include a nitrous oxide injection system 250 and a frame rail boosting system 252 for providing boost to the engine, as will be discussed below. A transmission 222 may be coupled to the engine 201.

Figure 2:
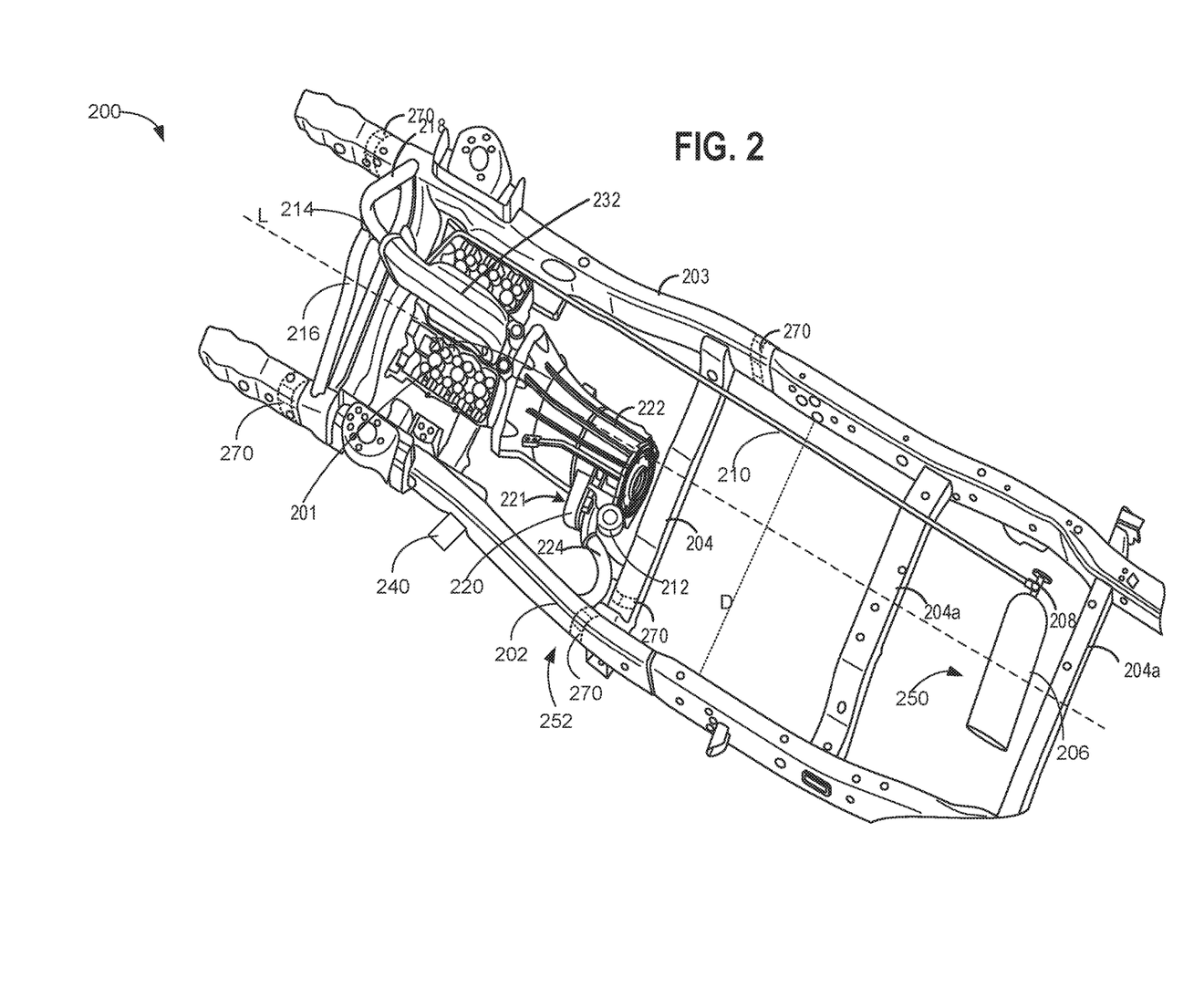
FIG. 2 illustrates a two-step engine boosting system with an air pump and a nitrous oxide tank coupled to the engine.

The transmission 222 may be coupled to the engine through a torque converter (not shown). Engine output may be transmitted via the torque converter to the transmission 222 by engaging one or more transmission clutches (not shown). A transmission gear may be selected automatically or a vehicle operator may select a transmission gear by adjusting a coupled vehicle gear selector (not shown). Torque may be transmitted from the engine 201 to the transmission 222, with or without torque multiplication responsive to various engine operating conditions, for example, based on engine torque demand, engine speed etc.

Torque output from the transmission 222 may in turn be relayed to wheels (not shown) to propel the vehicle. Specifically, the transmission 222 may adjust an input driving force along an input shaft responsive to a vehicle traveling condition before transmitting an output driving force to the wheels. The wheels may be locked by engaging wheel brakes for example, in response to a vehicle operator pressing a brake pedal (not shown). In the same way, wheels may be unlocked by disengaging wheel brakes in response to the vehicle operator releasing the brake pedal.

The transmission 222 may also include additional output shafts, for example, an output shaft coupled to an air pump 220. In one example, an electromagnetic clutch 221 may engage or disengage the air pump 220 to the transmission 222. In one example, the transmission 222 when engaged may transfer force from the engine to the output shaft coupled to the air pump 220, thereby driving the air pump. In one example, the air pump 220 may be an air compressor, compressing air for boosting applications, as will be discussed below. In a further example, the transmission 222 may be coupled to the air pump through a gearbox (not shown), wherein the air pump 220 may be driven fast or slow, depending on engine operating parameters.

Figure 5:
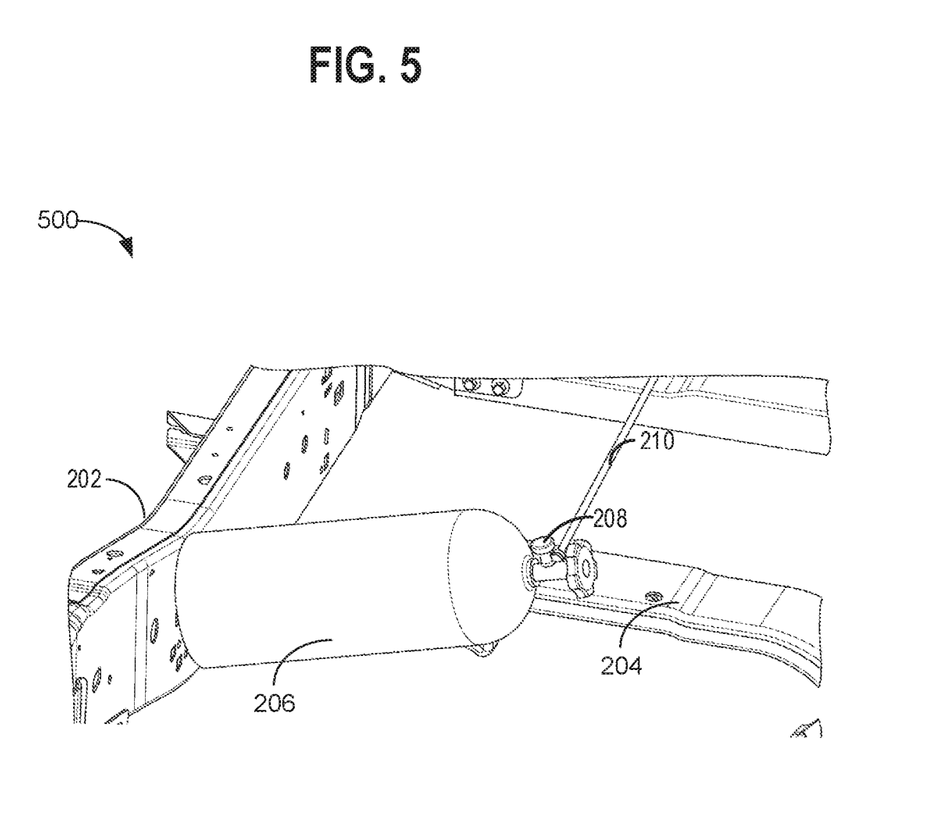
FIG. 5 shows the nitrous oxide tank of the two-step engine boosting system.

The nitrous oxide injection system 250 of the two-step engine boosting system 200, illustrated in FIG. 2 and in a magnified view 500 in FIG. 5, may include a storage tank 206 for storing nitrous oxide under pressure for boosting applications. At an outlet of the storage tank a pressure gauge 208 may be used to monitor the pressure inside the storage tank 206. A feed line 210 from the storage tank 206 may fluidically connect the storage tank 206 to the engine 201, as shown in FIG. 2.

Figure 3:
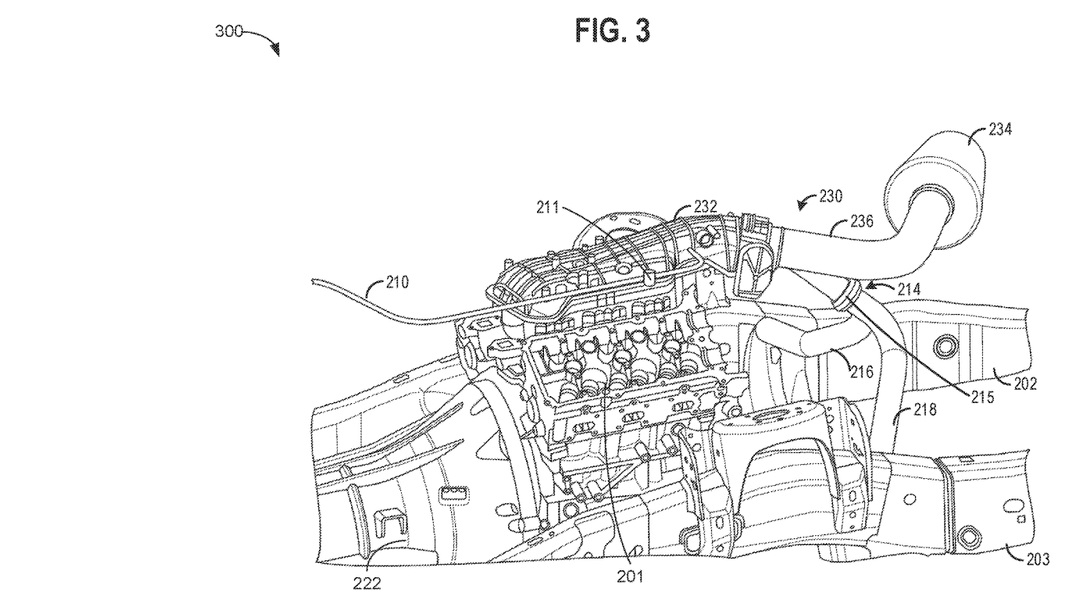
FIG. 3 shows a perspective view of the two-step engine boosting system of FIG. 2.
Figure 4:
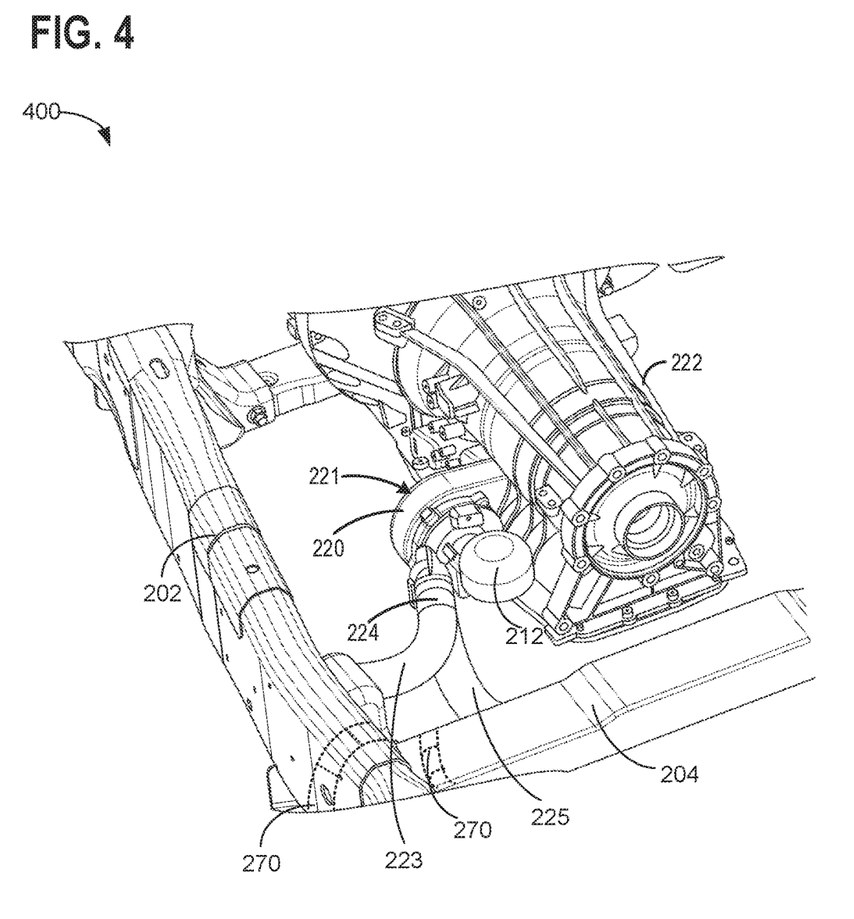
FIG. 4 shows the air pump of the two-step engine boosting system.

A first valve 211 may regulate the flow of nitrous oxide from the storage tank 206 through the feed line 210 to the engine 201, as illustrated in a view 300 in FIG. 3. In one example, the feed line 210 may fluidically connect to an air intake system 230 of the engine. In one example, the feed line 210 may connect to an intake manifold 232. After passing through the first valve 211, the nitrous oxide that flows through the feed line 210, may be introduced at the intake manifold 232, from where the nitrous oxide may be introduced into the engine cylinders. In another example, the feed line 210 may join the air intake system 230 at an intake passage 236 downstream of an air filter 234. The intake passage 236 may then connect to the intake manifold 232.

A position of the first valve 211 may be controlled by an actuator, such as a solenoid, stepper motor, etc., configured to receive commands from a controller, such as the controller 12 of FIG. 1, responsive to engine operating conditions, as will be discussed below with reference to FIG. 7.

As illustrated in FIG. 2, the two-step engine boosting system 200 also includes the frame rail boosting system 252. The frame rail boosting system 252 may include the air pump 220 coupled to the transmission 222 of the engine 201, as described above. The air pump 220 driven by the transmission may direct compressed air to a first rail 202 and a second rail 203. The first rail 202 and the second rail 203 may be fluidically connected by a cross rail 204. Additionally, a plurality of structural cross rails 204a may provide structural support by connecting the first rail 202 and the second frame rail. In one example, the plurality of structural cross rails 204a may be hollow and may fluidically connect the first rail 202 and the second rail 203. In other examples, the plurality of structural cross rails 204a may not be configured to fluidically connect the first rail and the second rail, e.g., the plurality of structural cross rails 204a may be solid or not configured to be leak-tight.

The first rail 202 and the second rail 203 along with the cross rail 204 may be an existing vehicle frame rail, providing structural support to various components of the vehicle. In one example, the first rail 202 and the second rail 203 may be positioned and attached to an existing undercarriage of a vehicle, or may comprise a sub-frame supporting the engine and transmission. The first rail 202 and the second rail 203 may be parallel to each other, extending along a length L of the vehicle, as illustrated in FIG. 2. The cross rail 204 and the plurality of structural cross rails 204a may be perpendicular to the first rail 202 and the second rail 203. The cross rail 204 and the plurality of structural cross rails 204a may traverse a distance D separating the first rail 202 and the second rail 203.

The frame rail boosting system 252 may be an air tight storage device for storing the compressed air supplied from the air pump 220. The first rail 202 and the second rail 203 may be hollow sealed tubes, except at specific air inlet or air outlet points, where a leak-proof sealing may fluidically connect the first rail 202 and the second rail 203 to other fluidic conduits.

Air storage capacity of the frame rail air boosting system may be dependent on placement of a plurality of blocking plates 270, along the first rail 202 and the second rail 203, and at the cross rail 204, as illustrated in FIG. 2. The plurality of blocking plate 270 may be located inside the hollow frame rails and inside the hollow cross rail, and may block fluidic connections with in the frame rail air boosting system to define a volume of air storage in the frame rail boosting system. Air from the compressor flowing into the frame air rail boosting system may be stored in a volume defined by the plurality of blocking plates 270 along the hollow frame rails and the cross rail. In other examples, the blocking plates may be in other locations of the frame rail boosting system, defining storage volume for compressed air.

In one example, the cross rail 204 may fluidically connect to the first rail 202 and the second rail 203. In one example, the cross rail 204 may be a hollow air tight tube, thereby acting as a fluid conduit between the first rail 202 and the second rail 203, as well as providing structural support to the frame rails.

Compressed air may be directed to the first rail 202 and to the second rail 203 from the air pump 220 through a pump outlet conduit 224. The pump outlet conduit 224 may bifurcate to a first conduit 223 and a second conduit 225, as is illustrated in a magnified view 400 in FIG. 4. The first conduit 223 may supply compressed air from the air pump 220 to the first rail 202 and the second conduit 225 may supply compressed air to the cross rail 204, which may then fluidically connect to the second rail 203. In another example, the first conduit 223 and the second conduit 225 may fluidically connect to the first rail 202 and to the second rail 203, respectively, delivering compressed air from the air pump 220 to the frame rail boosting system 252.

Air pumped by the air pump to the frame rail boosting system 252 and delivered from the frame rails to the engine may be cooled by one or more intercoolers (not shown) positioned along the air flow path to the engine, to provide cooled charge air to the engine for combustion. One or more filters may be present along the air flow path from the air pump to the frame rail boosting system, for example, a filter 212 at an inlet between the air pump 220 and the frame rail boosting system 252.

The air in the frame rail boosting system 252 may exit the first rail 202 through a first exit conduit 216 and the second rail 203 through a second exit conduit 218, as illustrated in FIG. 2. The first exit conduit 216 and the second exit conduit 218 may join at a boost introduction point 214 in proximity of the engine 201, as illustrated in FIGS. 2 and 3. A second valve 215 may be present at the boost introduction point 214.

The boost introduction point 214 may be at the air intake system 230. In one example, the boost introduction point 214 may be at the intake manifold 232. In another example, the boost introduction point 214 may be at the intake passage 236 upstream of the intake manifold 232. A charge air cooler may be present upstream of the boost introduction point 214 to cool the charge air being delivered to the engine, such as the charge air cooler 165 present along the air line 163 connecting the compressor 162 to the intake manifold 44 in FIG. 1. In another example, the charge air cooler may be present downstream of the boost introduction point 214. In some examples, more than one charge air cooler may be present. The boost introduction point 214 may be upstream of a throttle along the air intake system, for example, the air line 163 joining the intake manifold 44 upstream of the throttle 62 in FIG. 1. The throttle position may be adjusted to regulate boost delivery to the engine.

A position of the second valve 215 at the boost introduction point 214 may be controlled by an actuator, such as a solenoid, stepper motor, etc., configured to receive commands from a controller, such as the controller 12 of FIG. 1, responsive to engine operating conditions, as will be discussed below with reference to FIG. 7.

Pressure inside the frame rail boosting system 252 may be monitored, for example, by a pressure sensor 240. The pressure sensor 240 may be present along the first rail 202. In another example, the location of the pressure sensor 240 may be along the second rail. In other examples, more than one pressure sensor may be present along the frame rail boosting system 252. Based on the pressure inside the frame rail boosting system, available air storage capacity of the frame rail storage system may be assessed and air flow to the frame rail storage system may be regulated accordingly. For example, if pressure is below a threshold, additional air may flow from the air pump to the frame rail boosting system 252. Conversely, if pressure is above a functional threshold, the frame rail air system may have adequate air to provide boost to the engine. Regulating the operation of the two-step engine boosting system based on pressure of the frame rail boosting system will be discussed further with reference to FIG. 7.

Figure 6:
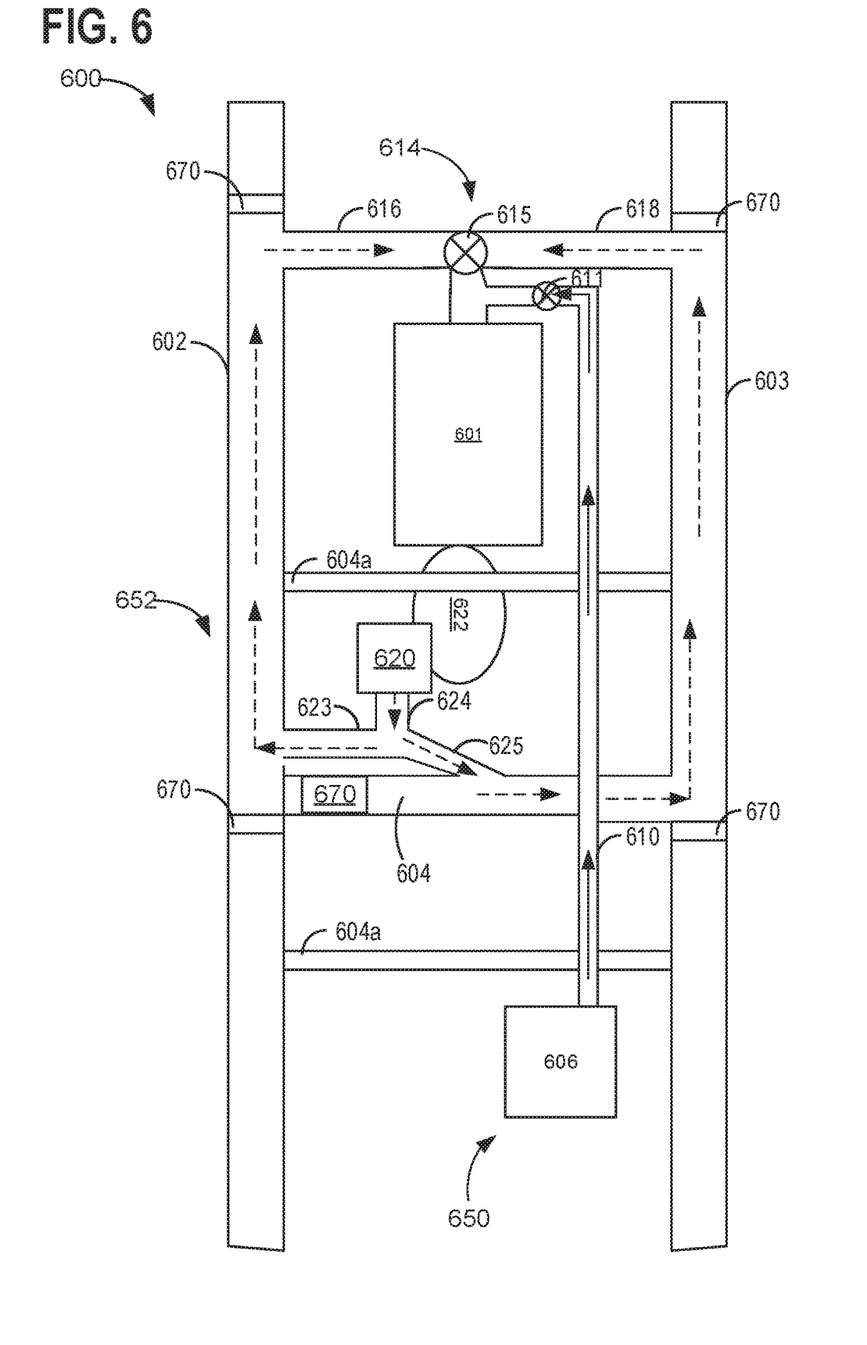
FIG. 6 is a schematic of the two-step engine boosting system of FIG. 2.

FIG. 6 illustrates a schematic 600 of a two-step engine boosting system, for example the two-step engine boosting system 200 of FIG. 1, with a frame rail boosting system 652 and a nitrous oxide injection system 650. The frame rail boosting system 652 may include a first rail 602 and a second rail 603 for storage of air for boosting applications and a cross rail 604 connecting the first rail 602 and the second rail 603. Additionally, a plurality of structural cross rails 604a may provide structural support to the first rail 602 and the second rail 603. An engine 601 may be coupled to a transmission 622, similar to engine 201 coupled to the transmission 222 of FIGS. 2-5. The transmission 622 may be engaged or disengaged depending on engine operating conditions, including vehicle speed. The transmission 622 when engaged may drive an air pump 620 coupled to the transmission, for example, through an output shaft of the transmission. In one example, the air pump 620 may be an air compressor. Air from the air pump 620 may flow through a pump outlet conduit 624 and flow through a first conduit 623 to the first rail 602 and through a second conduit 625 to the second rail 203. In one example, the first conduit 623 may directly connect to the first rail 602, and the second conduit 625 may fluidically couple to the cross rail 604, which may then fluidically connect to the first rail 602 and the second rail 603.

The air may further move along the first rail 602 and the second rail 603 to occupy available volume, as indicated by dashed lines with arrowheads. The available volume in the frame rail boosting system may be defined by a plurality of blocking plates 670 along the first rail and the second rail and at the cross rail 604. Additional and or alternate placement of blocking plates may be used to further define the available volume for air storage.

In one example, the pump outlet conduit 624 may open into the cross rail 604, which may flow air from the pump rail into the first rail and the second rail. When the first rail 602 and the second rail 603 reach a maximum storage capacity, air pump 620 may be disengaged from the transmission 622, for example, disengaged through an electromagnetic clutch coupling the air pump to the transmission in which case no more air may be directed from the air pump 620 to the frame rails.

Air stored in the frame rail boosting system 252 may exit through a first exit conduit 616 at the first rail 602 and through a second exit conduit 618 at the second rail 603, as illustrated in FIG. 6, and may flow towards a boost introduction point 614. A valve 615 may be present at the boost introduction point 614. The valve 615 may regulate airflow from the frame rail boosting system 652 to the engine 601 to provide boost depending on engine operating conditions, as will be described below with reference to FIG. 7.

Boost may be provided by the nitrous oxide injection system 650, including a storage tank 606 for storing nitrous oxide under pressure. When indicated, nitrous oxide may be delivered through a feed line 610 from the storage tank 606 to the engine, as indicated by solid lines with arrowhead. A valve 611 may regulate flow of nitrous oxide from the feed line 610 to the engine 601.

Figure 7:
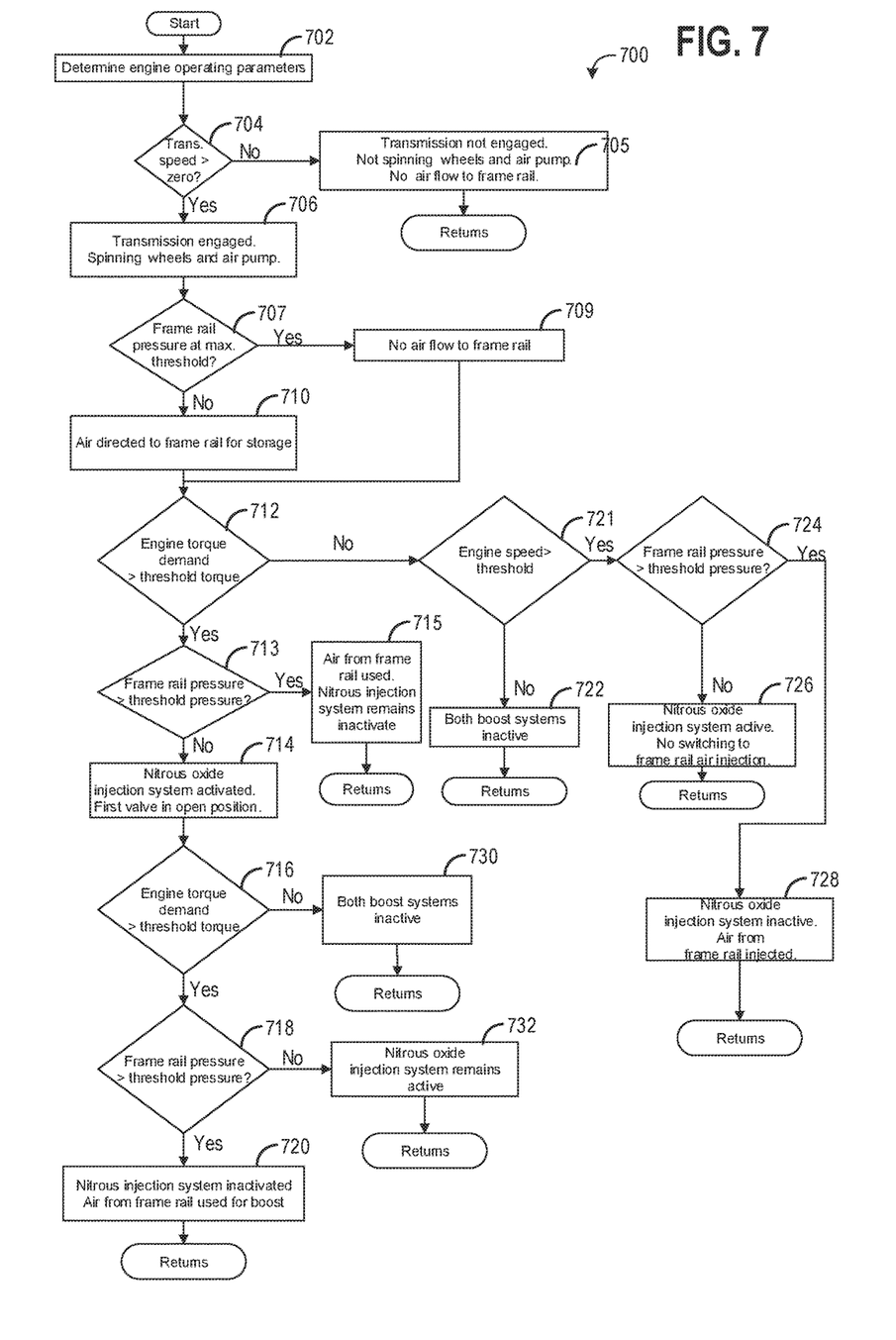
FIG. 7 illustrates a method for operating a two-step engine boosting system.
Figure 8:
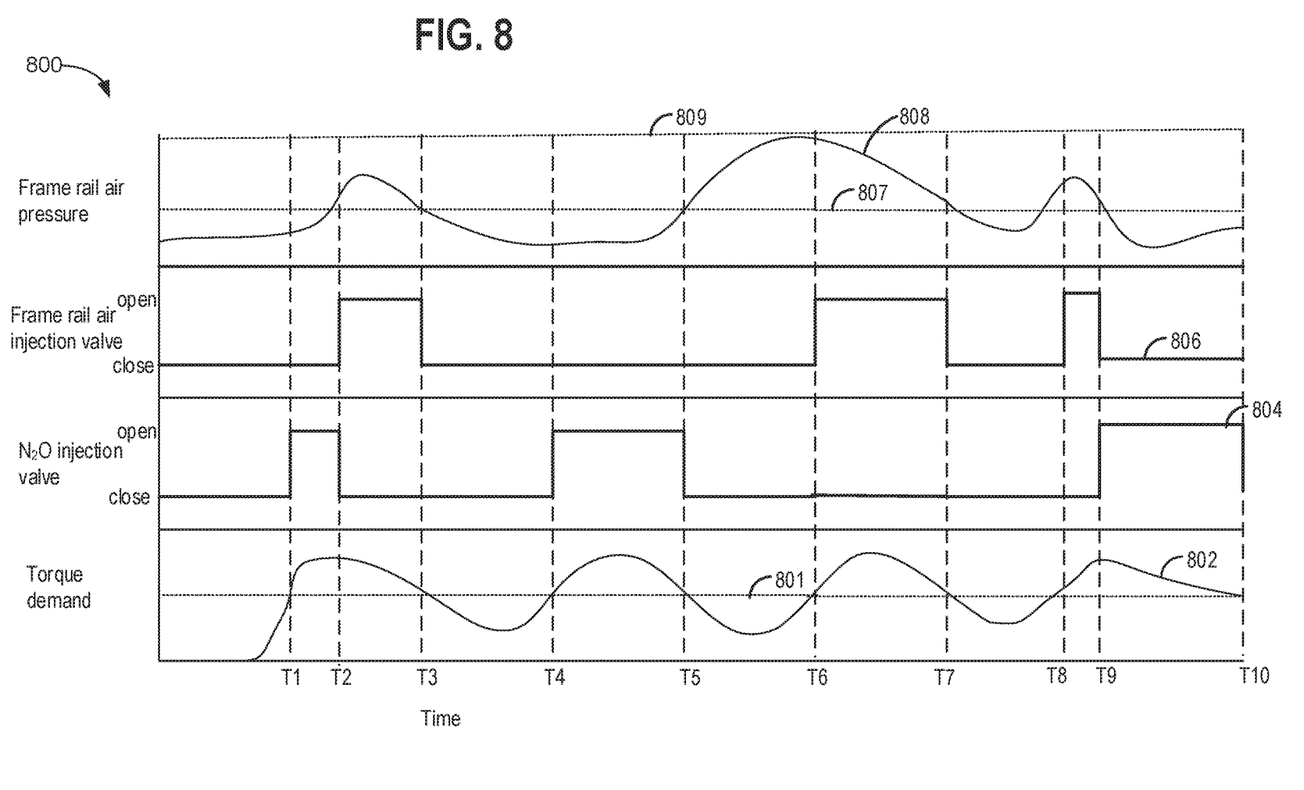
FIG. 8 illustrates an example operating sequence for the two-step engine boosting system of FIG. 2.

FIG. 7 illustrates a method 700 for operating a two-step engine boosting system, for example, the two-step engine boosting system 200 coupled to the engine 201 illustrated in FIG. 2. The two-step engine boosting system may include the nitrous oxide injection system 250, and the frame rail boosting system 252, as described above with reference to FIGS. 2-5. In one example, the method 700 may regulate the flow of boost to the engine by regulating position of the first valve 211 and the second valve 215 responsive to engine operating conditions, such as engine torque demand, engine speed etc.

Instructions for carrying out method 700 and the rest of the methods included herein may be executed by a controller, for example, the controller 12, based on instructions stored on a memory of the controller and in conjunction with signals received from sensors of the engine system, including NOx sensors, UEGO sensors, pressure sensors, etc., described above with reference to FIG. 1. The controller may employ engine actuators of the engine system to adjust engine operation, according to the methods described below. In one example, based on input from sensors, the controller 12 may employ actuators coupled to the first valve 211 and the second valve 215 of the two-step engine boosting system 200, to adjust the position of the first valve 211 and the second valve 215.

The method 700 begins at 702 by assessing engine operating parameters, which may include but are not limited to, engine speed, engine torque demand, engine temperature, etc. At 704, the method 700 determines if transmission speed is more than zero (e.g., if the output shaft of the transmission is spinning at a speed greater than zero). If transmission speed is not more than zero at 704, the transmission may be disengaged, for example, while idling out of gear (e.g., in park). The method 700 proceeds to 705, where the transmission is not transmitting power from the engine to the wheels or to the air pump. Hence, no compressed air flows from the air pump to the frame rail for storage. The method 700 then returns.

If transmission speed at 704 is more than zero, the method 700 proceeds to 706, where the transmission is engaged, transmitting engine power to the wheels and to the air pump coupled to the transmission. In one example, an output shaft of the transmission may be rotating the air pump to compress air for storage in the frame rails.

The method 700 proceeds 707 to determine if the frame rail boosting system has additional air storage capacity by assessing if the pressure inside the frame rail system is at a maximum threshold pressure. If yes, the method 700 may not direct additional air from the compressor to the frame rail storage system. Pump may be engaged or disengaged with an electromagnetic clutch activated with a signal from ECM. The method 700 then proceeds to 712, described in more detail below. However, if the pressure inside the frame rail boosting system is not at the maximum threshold pressure (e.g., it is less than the maximum threshold pressure), the method 700 may flow air from the air pump to the frame rail boosting system for storage at 710.

At 712, method 700 determines if engine torque demand is above a threshold torque. The threshold torque may be a fixed predetermined torque in one example. In another example, the threshold torque may include any increase in torque demand that is not currently met, for example, during an acceleration event. If the torque demand is not above the threshold torque at 712, the method 700 proceeds to 721, which will be explained in more detail below.

If the torque demand at 712 is above the threshold torque, for example, during an acceleration event, during uphill driving, etc., the method 700 proceeds to 713. At 713, the method 700 checks if adequate air is present in the frame rail air storage system to supply the boost. A pressure inside the frame rail system may be determined, for example, by pressure sensor 240 illustrated in FIG. 2. It may be assessed if the pressure inside the frame rail system is above a threshold pressure at 713. The threshold pressure at 713 may be less than the frame rail pressure maximum threshold at 707. If the frame rail pressure is above the threshold pressure at 713, the frame rail boosting system has adequate air to provide to the engine for meeting the boost demand. The method 700 proceeds to 715, where air is injected from the frame rail boosting system to the engine to meet the torque demand, while the nitrous oxide injection system remain inactive. Air is injected from the frame rail to the engine by positioning the second valve in an open position, and while the first valve for nitrous oxide injection remains in a closed position. In one example, during 715, as air from the frame rails is directed to the engine, the pressure inside the frame rail boosting system may fall below the threshold pressure, indicating that adequate air is not available in the frame rail for providing boost. During such a condition, a switch from the frame rail boosting system to the nitrous oxide injection system may take place, where instead of directing air from the frame rail, nitrous oxide from the nitrous oxide injection system flows the engine for meeting the torque demand. The method 700 then returns.

If the frame rail pressure is not above the threshold pressure at 713, the method 700 proceeds to 714, where to meet the torque demand, nitrous oxide may be injected from the nitrous oxide injection system to the engine. In one example, nitrous oxide may flow through the feed line, through the first valve in an open position to the engine, providing an immediate source of oxygen for increasing combustion of fuel inside the engine, generating additional power to meet the torque demand.

At 714, in one example, the nitrous injection system may be active for a predefined period, after which the method 700 proceeds to 716 to determine if engine torque demand is still above the threshold torque (for example, continued uphill driving). If no, boost may not be desired and the nitrous oxide injection system may be switched off at 730 by closing the first valve, after which the method 700 returns.

If torque demand at 716 is above the threshold, boost to the engine is still desired. The method 700 proceeds to 718 to check if adequate air is present in the air storage system to supply the boost. The pressure inside the frame rail system may be determined and assessed if the pressure is above the threshold at 718. The pressure threshold at 718 may be less than the frame rail pressure maximum threshold at 707. If the frame rail pressure is above the threshold pressure at 718, the frame rail boosting system has adequate air to provide to the engine for meeting the boost demand. The method 700 proceeds to 720, where the nitrous oxide injection system is switched off, for example, by positioning the first valve in a closed position, and exhaust air from the frame rail system is directed to flow to the engine by opening the second valve. The compressed air supplied to the engine from the frame rail system may increase fuel combustion in the engine cylinders, which may provide the desired torque to the engine. Method 700 returns.

At 718, if the pressure inside the frame rail is below the threshold pressure, adequate air is not available in the frame rail for delivering from the frame rail to the engine. In such case, the method 700 proceeds to 732, where the nitrous oxide injection system remains active, supplying nitrous oxide to the engine through the first valve in the open position to meet boost requirements. The method 700 then returns.

As mentioned above, if at 712 the torque demand is not above the threshold, for example if engine torque is being met (e.g., the engine is not accelerating), the method 700 proceeds to 721 to assess if the engine speed is above the threshold speed. In one example, the threshold speed may be a relatively high engine speed, such as above 3000 RPM If no, the method proceeds to 722, where both boost systems are inactive (for example, the first valve 211 and the second valve 215 in closed position), and no boost is provided to the engine. Method 700 returns.

If at 721, the engine speed is above the threshold speed, the method 700 proceeds to 724 to assess if the pressure inside the frame rail is above the threshold. If yes, at 728 nitrous oxide injection system remains inactive, while air from the frame rail boosting system is injected to the engine. The method 700 then returns. In this way, if the engine is undergoing a sustained high speed operation while the torque demand is met, for example a high speed operation after an acceleration event to reach the high speed, additional boost may be provided to allow operation at the high speed.

If air pressure in the frame rail is below the threshold pressure at 724, the method 700 proceeds to 726, where the nitrous oxide injection system is activated to provide the desired boost to the engine while no air is available in the frame rails for injection into the engine. The method 700 then returns.

Thus, the two-step engine boosting system may deliver requested boost to the engine by using a frame rail air injection system configured to provide boost via a compressor coupled to a vehicle transmission during high torque demand conditions. During conditions where boost from the frame rail air injection system is unavailable, such as when the compressor is spooling up, a nitrous oxide injection system may be used for immediate boost. Once the compressor is at a designated speed and/or once an amount of compressed air stored in the frame rail air injection system reaches a threshold, the nitrous oxide injection system may be disabled and the system may switch to delivering boost via the frame rail air injection system. In this way, boost may be provided only when torque demand is high rather than continuously, thus eliminating the need for a large and/or costly boosting system and providing a cost effective and efficient boosting system for real world driving conditions FIG. 8 shows example operating sequence 800 during operation of a two-step engine boosting system. The example operating sequence 800 may be generated during operation of the engine with the two-step engine boosting system 200 discussed above with reference to FIGS. 2-6. Engine torque demand (plot 802) and corresponding position (open or closed) of a nitrous oxide injection valve (plot 804) and a frame rail air injection valve (plot 806) along with frame rail air pressure (plot 808), are plotted along the Y axis. The X axis represents time, increasing from left side of the figure to the right side of the figure. Vertical markers (with dashed lines) indicate the times of interest.

Prior to T1, the torque demand (plot 802) is below a threshold torque 801, such that no boosting is desired and hence, the nitrous oxide injection valve (plot 804) and the frame rail injection valve (plot 806) may be both in a closed position, and no boost is supplied to the engine. The frame rail air pressure 808 may be below a threshold pressure 807 prior to T1. In one example, additional air may be directed to the frame rail by the air pump driven by the transmission prior to T1, as additional air storage is available in the frame rail.

At T1, the torque demand (plot 802) is above the threshold torque 801. In one example, torque demand may increase at T1 due to an acceleration event, such as during a vehicle launch. To meet the torque demand, the nitrous oxide injection valve may be moved to an open position (plot 804) at T1, supplying nitrous oxide to the engine to meet the immediate torque demand between T1-T2. During T1-T2, the frame rail air pressure (plot 808) is increasing, and the air pump driven by the transmission continues to direct air to the frame rail boosting system, but the frame rail air pressure is still below the threshold pressure 807. Hence, no boost may be supplied from the frame rail air boosting system. Further, because the transmission may not have been engaged prior to the vehicle launch, the air pump/compressor may not be fully spooled up during the vehicle launch/acceleration event. When the compressor is not spooled up, even if some air is stored in the frame rail boosting system, the compressor may not be able to meet the boost demand, and thus the nitrous oxide may be supplied instead.

At T2, the frame rail air pressure may increase to reach above the threshold pressure 807, and the compressor may be at full speed. A switch in the boosting system may happen at T2, wherein the nitrous oxide injection valve moves to a closed position (plot 804), and simultaneously the frame rail air injection valve opens (plot 806), directing air from the frame rail to the engine for meeting torque demand. In one example, there may be a short overlap period when both the nitrous oxide injection valve and the frame rail air injection valve are open to sustain boost supply to the engine. As the air from the frame rail flows to the engine through the open frame rail air injection valve during T2-T3, the corresponding pressure inside the frame rail may keep decreasing, as indicated by plot 808.

At T3, the torque demand 802 may be met and the torque demand may be less than the threshold torque 801 and both the nitrous injection valve and the frame rail air injection valve may be in closed position. At T3, the frame rail air pressure (plot 808) may be less than the threshold pressure 807. In one example, an air pump coupled to a transmission of an engine may deliver air to the frame rail for storage when the transmission is engaged (spinning the air pump), as indicated by a gradual increase in frame rail pressure over T3-T4 and T4-T5.

Between T4-T5, the torque demand (plot 802) may again be more than the threshold torque 801. In response to the torque demand, boost may be supplied to meet the torque demand by opening the nitrous oxide air injection valve (plot 804). The switching from nitrous oxide injection to frame rail air injection does not occur during T4-T5, as the frame rail air pressure is below the threshold pressure 807, wherein not enough air is present in the frame rail for meeting the torque demand. The nitrous injection valve continues to remain open during T4-T5, while the frame rail air injection valve remains closed. At T5, the torque demand is at the threshold torque 801 in response to which the nitrous oxide injection valve may be closed, as no more boost is requested.

During T3-T4 and T4-T5, the frame rail pressure may be increasing, approaching the threshold pressure 807. At T5, the frame rail air pressure (plot 808) reaches the threshold pressure 807. The frame rail air pressure may continue rising between T5-T6, as the transmission may be engaged and spinning the air pump to store air in the frame rail until a capacity pressure 809 is reached at T6. The frame rail may now have adequate pressure for injection of air from the frame rail boosting system in response to subsequent increase in torque demand, without the need for injecting the nitrous oxide.

At T6, the frame rail air pressure may be at the capacity pressure 809. The torque demand (plot 802) may more than the threshold torque at T6. The torque demand during this duration may be met by opening the frame rail air injection valve (plot 806), while continuing to have the nitrous oxide injection valve in the closed position, injecting frame rail air to meet the torque demand. The torque demand (plot 802) may be met and may fall below the threshold torque at T7. Thus, during T6-T7, torque demand is met by directing only frame rail air for boosting. No nitrous oxide is injected during T6-T7, as adequate air is available in the frame rail for meeting the torque demand, and the compressor may be spinning fast enough to sustain delivery of compressed air, even if the supply of compressed air in the frame rail is depleted.

Between T7-T8, the torque demand (plot 802) may be less than the threshold torque 807, the frame rail air injection valve (plot 806) and the nitrous oxide injection valve (plot 804) are closed. The frame rail air pressure (plot 808) continues to increase after T7. The air pump driven by the transmission may be directing air to the frame rail air storage system. Prior to T8, the frame rail air pressure increases to more than the threshold pressure 807 but does not reach the capacity pressure 809, indicating that some air is available in the frame rail system for boosting applications.

At T8, the torque demand may increase above the threshold torque demand. The frame rail air injection valve may open to provide boost, while the nitrous oxide injection valve remains closed during T8-T9. As air is injected from the frame rail air system, the frame rail air pressure may keep decreasing (plot 808), and at T9 may decrease below the threshold pressure 807. At T9, the torque demand is still above the threshold torque 801, hence, the boosting system is switched from the frame rail system to the nitrous oxide injection system at T9.

During T9-T10, torque demand is met by injecting nitrous oxide through the nitrous oxide injection valve in open position (plot 804) while the frame rail air injection valve is closed (plot 806). At T10, the torque demand is met and the nitrous oxide injection valve is closed.

In this way, responsive to engine operating conditions, a two-step engine boosting system may supply the requested boost to the engine by either injecting nitrous oxide from a storage tank into the engine cylinders or by injecting air stored in a frame rail boosting system to the engine. An air pump driven by the transmission of the engine may direct air for storage in the frame rail boosting system.

The technical effect of regulating boost flow to the engine by switching between a nitrous oxide injection system and a frame rail boosting system may include providing adequate power to the engine to meet the torque demand during real world driving conditions without increasing vehicle system cost and complexity.

A system including, a nitrous oxide storage tank fluidically coupled to an engine through a feed line, an air pump driven by a transmission of the engine, the air pump fluidically connected to a frame rail boosting system fluidically coupled to the engine, and a first valve regulating nitrous oxide flow from the feed line to the engine, and a second valve regulating air flow from the frame rail boosting system to the engine. In a first example of the system, wherein the frame rail boosting system includes a first hollow frame rail parallel to a second hollow frame rail with a hollow cross rail fluidically connecting the first hollow frame rail to the second hollow frame rail. A second example of the system optionally includes the first example of the system and further includes, wherein the frame rail air boosting system is positioned along an undercarriage of a vehicle, with the first hollow frame rail parallel to the second hollow frame rail along a length of the vehicle, and wherein the first hollow frame rail, second hollow frame rail, and the first hollow cross rail are configured to support the engine. A third example of the system optionally includes one or more of the first and second examples, and further includes, wherein an electromagnetic clutch may engage the air pump to the transmission. A fourth example of the system optionally includes one or more of the first through third examples, and further includes, a controller including instructions executable to actuate the first valve to an open position responsive to engine torque demand above a threshold. A fifth example of the system optionally includes one or more of the first through fourth examples, and further includes, wherein the controller includes instructions executable to actuate the first valve to a closed position and actuate the second valve to a an open position responsive to engine torque demand above the threshold and a pressure inside the frame rail boosting system above a threshold pressure. A sixth example of the system optionally includes one or more of the first through fifth examples, and further includes, wherein further comprising at least one pressure sensor configured to relay the pressure inside the frame rail boosting system to the controller. A seventh example of the system optionally includes one or more of the first through sixth examples, and further includes, wherein at least one charge air cooler is present along the frame rail boosting system. An eighth example of the system optionally includes one or more of the first through seventh examples, and further includes, wherein the feed line and an air conduit from the frame rail boosting system connects to an air intake system of the engine.

A method for an engine including, responsive to an engine torque demand above a threshold and responsive to a pressure of a frame rail boosting system below a threshold pressure, injecting nitrous oxide from a nitrous oxide injection system to an engine, and responsive to the engine torque demand above the threshold and responsive to the pressure of the frame rail boosting system above the threshold pressure, suspending nitrous oxide injection and injecting compressed air to the engine from the frame rail boosting system, the frame rail boosting system receiving compressed air from a compressor driven by a transmission of the engine. In a first example of the method, further comprising, responsive to the engine torque demand above the threshold, and responsive to a speed of the compressor below a threshold speed, injecting nitrous oxide from the nitrous oxide injection system. A second example of the method optionally includes the first example and further comprising, responsive to the engine torque demand below the threshold and engine speed above a speed threshold and the pressure inside the frame rail boosting system above the threshold pressure, injecting air from the frame rail boosting system to the engine. A third example of the method optionally includes one or more of the first and second examples, and further comprising, responsive to the pressure of the frame rail boosting system above the threshold pressure and responsive to the engine torque demand above the threshold, injecting air from the frame rail boosting system to the engine, and after air injection from the frame rail boosting system has commenced, and responsive to the engine torque demand above the threshold and responsive to the pressure of the frame rail boosting system below the threshold pressure, suspending the injecting of the air from the frame rail boosting system and injecting nitrous oxide from the nitrous oxide injection system to the engine. A fourth example of the method optionally includes one or more of the first through third examples, and further comprising, responsive to the pressure of the frame rail boosting system above the threshold pressure and responsive to the engine torque demand above the threshold, injecting air from the frame rail boosting system to the engine until the engine torque demand drops below the threshold, without activating the nitrous oxide injection system. A fifth example of the method optionally includes one or more of the first through fourth examples, and further comprising flowing air from the compressor to the frame rail boosting system for storage. A sixth example of the method optionally includes one or more of the first through fifth examples, and further comprising responsive to the pressure inside the frame rail storage system at a capacity threshold, stopping flow of air from the compressor to the frame rail storage system.

Another example system comprising, a nitrous oxide storage tank fluidically coupled to an engine through a first valve, an air pump driven by a transmission of the engine, the air pump fluidically connected to a frame rail boosting system, the frame rail boosting system fluidically coupled through a second valve to the engine, and a controller storing instructions executable to, responsive to a torque demand greater than a threshold demand, selectively actuate the first valve to an open position and the second valve to a closed position to inject nitrous oxide from the nitrous oxide storage tank to the engine, and to selectively actuate the first valve to a closed position and the second valve to an open position to inject air from the frame rail boosting system to the engine.

In a first example of the system, wherein the controller includes instructions executable to actuate the first valve to the open position and actuate the second valve to the closed position responsive to a pressure inside the frame rail boosting system below a threshold pressure, and actuate the first valve to the closed position and actuate the second valve to the open position responsive to the pressure inside the frame rail boosting system above the threshold pressure. A second example of the system optionally includes the first example and further includes, further comprising a plurality of blocking plates defining an air storage capacity of the frame rail boosting system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
   a nitrous oxide storage tank fluidically coupled to an engine through a feed line;
   an air pump driven by a transmission of the engine, the air pump fluidically connected to a frame rail boosting system fluidically coupled to the engine; and
   a first valve regulating nitrous oxide flow from the feed line to the engine, and a second valve regulating air flow from the frame rail boosting system to the engine.

2. The system of claim 1, wherein the frame rail boosting system includes a first hollow frame rail parallel to a second hollow frame rail with a hollow cross rail fluidically connecting the first hollow frame rail to the second hollow frame rail.

3. The system of claim 2, wherein the frame rail boosting system is positioned along an undercarriage of a vehicle, with the first hollow frame rail parallel to the second hollow frame rail along a length of the vehicle, and wherein the first hollow frame rail and the second hollow frame rail are configured to support the engine.

4. The system of claim 1, wherein an electromagnetic clutch may engage the air pump to the transmission.

5. The system of claim 1, wherein the air pump is an air compressor driven by an output shaft of the transmission.

6. The system of claim 1, further comprising a controller including instructions executable to actuate the first valve to an open position responsive to engine torque demand above a threshold.

7. The system of claim 6, wherein the controller includes instructions executable to actuate the first valve to a closed position and actuate the second valve to a an open position responsive to engine torque demand above the threshold and a pressure inside the frame rail boosting system above a threshold pressure.

8. The system of claim 7, further comprising at least one pressure sensor configured to relay the pressure inside the frame rail boosting system to the controller.

9. The system of claim 1, wherein at least one charge air cooler is present along the frame rail boosting system.

10. The system of claim 1, wherein the feed line and an air conduit from the frame rail boosting system connects to an air intake system of the engine.

11. A method, comprising:
   responsive to an engine torque demand above a threshold and responsive to a pressure of a frame rail boosting system below a threshold pressure, injecting nitrous oxide from a nitrous oxide injection system to an engine; and
   responsive to the engine torque demand above the threshold and responsive to the pressure of the frame rail boosting system above the threshold pressure, suspending nitrous oxide injection and injecting compressed air to the engine from the frame rail boosting system, the frame rail boosting system receiving compressed air from a compressor driven by a transmission of the engine.

12. The method of claim 11, further comprising, responsive to the engine torque demand above the threshold, and responsive to a speed of the compressor below a threshold speed, injecting nitrous oxide from the nitrous oxide injection system.

13. The method of claim 11, further comprising, responsive to the engine torque demand below the threshold and engine speed above a speed threshold and the pressure inside the frame rail boosting system above the threshold pressure, injecting air from the frame rail boosting system to the engine.

14. The method of claim 11, further comprising, responsive to the pressure of the frame rail boosting system above the threshold pressure and responsive to the engine torque demand above the threshold, injecting air from the frame rail boosting system to the engine; and
   after air injection from the frame rail boosting system has commenced, and responsive to the engine torque demand above the threshold and responsive to the pressure of the frame rail boosting system below the threshold pressure, suspending the injecting of the air from the frame rail boosting system and injecting nitrous oxide from the nitrous oxide injection system to the engine.

15. The method of claim 11, further comprising, responsive to the pressure of the frame rail boosting system above the threshold pressure and responsive to the engine torque demand above the threshold, injecting air from the frame rail boosting system to the engine until the engine torque demand drops below the threshold, without activating the nitrous oxide injection system.

16. The method of claim 11, further comprising flowing air from the compressor to the frame rail boosting system for storage.

17. The method of claim 16, further comprising, responsive to the pressure of the frame rail boosting system at a capacity threshold, stopping flow of air from the compressor to the frame rail boosting system.

18. A system, comprising:
   a nitrous oxide storage tank fluidically coupled to an engine through a first valve;
   an air pump driven by a transmission of the engine, the air pump fluidically connected to a frame rail boosting system, the frame rail boosting system fluidically coupled through a second valve to the engine; and
   a controller storing instructions executable to, responsive to a torque demand greater than a threshold demand, selectively actuate the first valve to an open position and the second valve to a closed position to inject nitrous oxide from the nitrous oxide storage tank to the engine, and to selectively actuate the first valve to a closed position and the second valve to an open position to inject air from the frame rail boosting system to the engine.

19. The system of claim 18, wherein the controller includes instructions executable to actuate the first valve to the open position and actuate the second valve to the closed position responsive to a pressure inside the frame rail boosting system below a threshold pressure, and actuate the first valve to the closed position and actuate the second valve to the open position responsive to the pressure inside the frame rail boosting system above the threshold pressure.

20. The system of claim 18, further comprising a plurality of blocking plates defining an air storage capacity of the frame rail boosting system.

* * * * *